Oct. 2, 1962     W. R. HAWTHORNE ET AL     3,056,373
FLEXIBLE BARGES
Filed Feb. 15, 1960            3 Sheets-Sheet 1
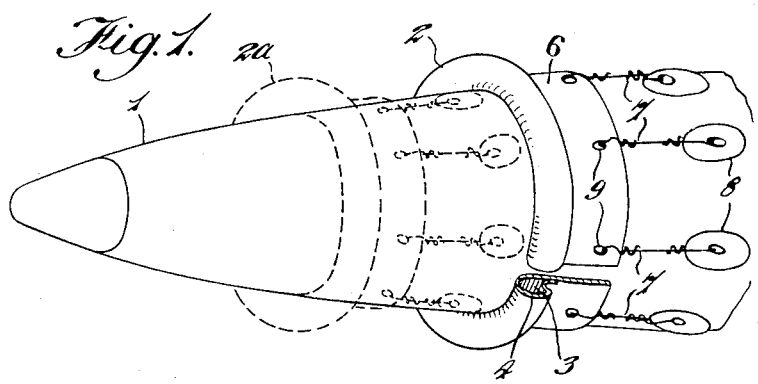
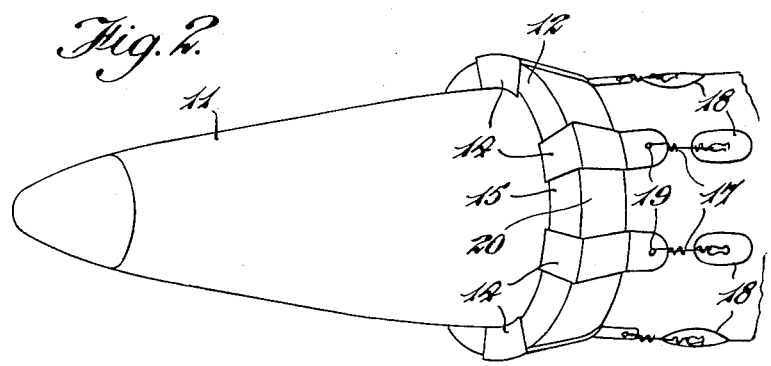
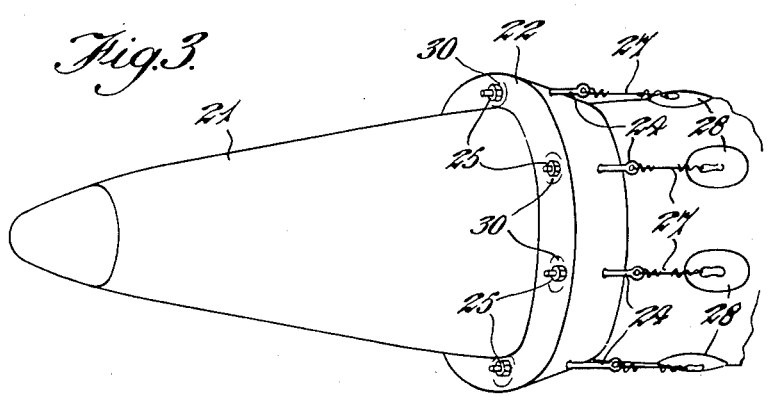
INVENTORS
William R. Hawthorne
Herbert G. Hasler
By Stevens, Davis, Miller & Mosher
ATTORNEYS

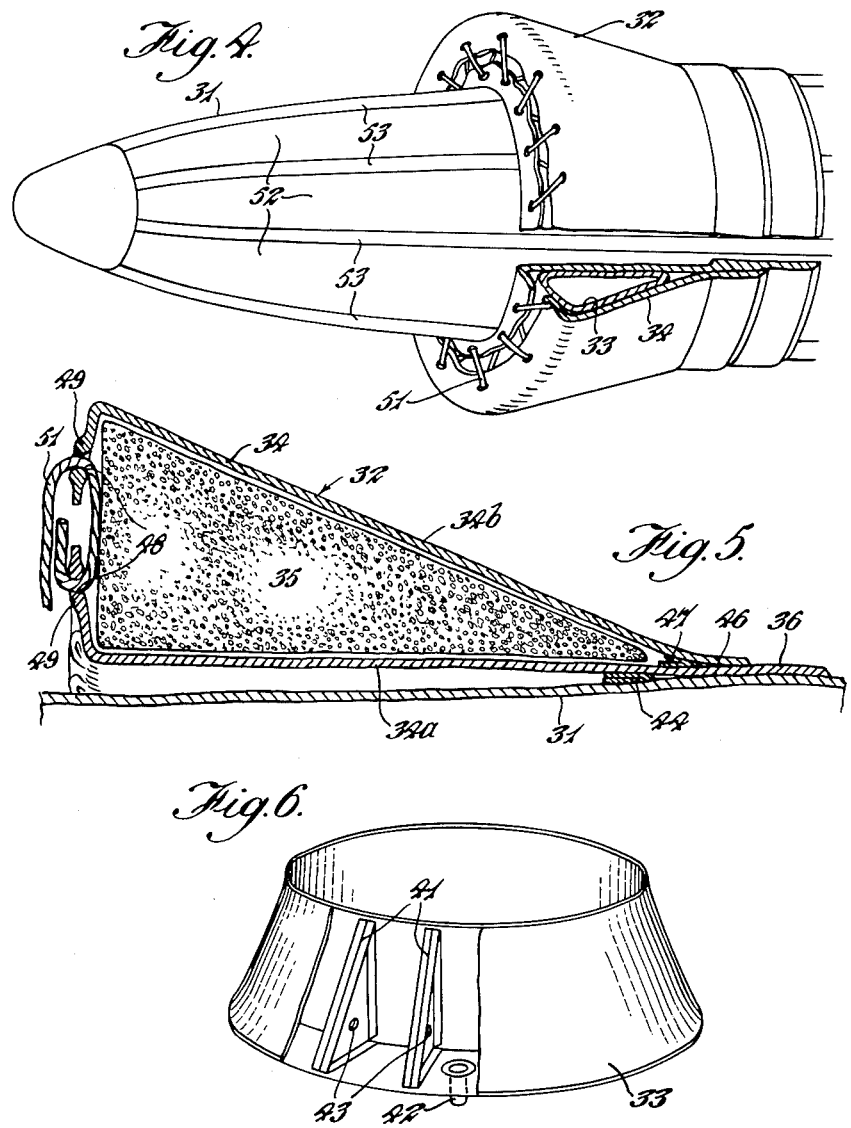

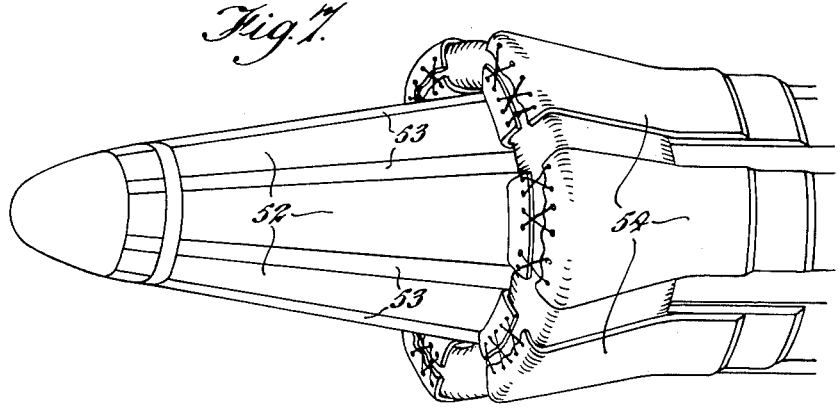
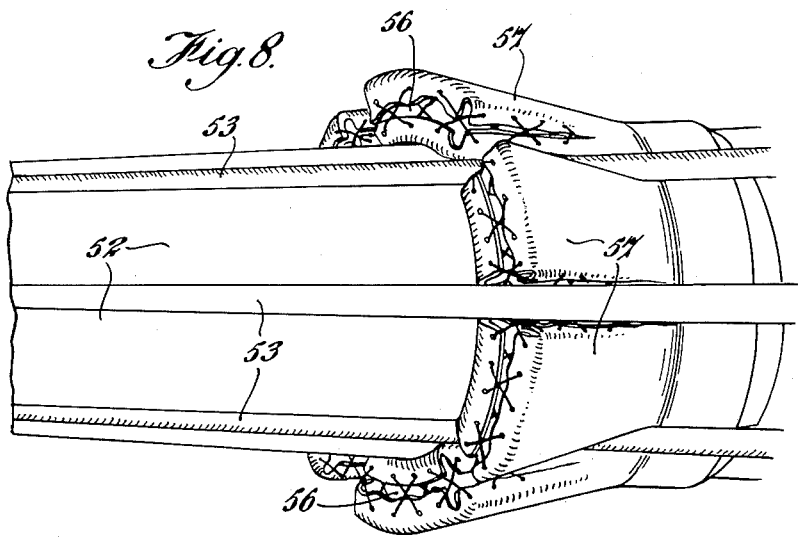

3,056,373
FLEXIBLE BARGES
William Rede Hawthorne, Cambridge, and Herbert George Hasler, Curdridge, near Southampton, England, assignors to Dracone Developments Limited, London, England
Filed Feb. 15, 1960, Ser. No. 8,735
Claims priority, application Great Britain Feb. 23, 1959
14 Claims. (Cl. 114—74)

The invention relates to totally enclosed barges of flexible material for the transport of fluid or granular or like pourable cargo by towing. More particularly, it is concerned with measures to counter snaking and other flexural oscillations of such barges.

It has been found that flexible barges having tapered ends, when towed at a speed above a certain critical speed, will execute sinuous movements which may build up to vicious oscillations capable of seriously damaging or, in extreme cases, destroying the barge. Oscillations of this nature are thought to be set up by forces acting laterally on the barge towards its stern and the present invention is concerned with a device for creating breakaway in the flow lines of the water passing along the surface of the barge and causing turbulence in the water around the stern. Such turbulence removes or decreases the forces causing snaking, because snaking depends on a smooth flow of water to cause sideways movement of the barge.

According to the invention, there is provided a barge comprising a totally enclosed flexible envelope surrounded by at least one water deflecting member or device in the form of a ring or segmented ring projecting from the surface of the barge at or near the stern thereof.

Each ring can be made of a rigid material, such as steel or aluminium, or of rubber or of cellular material such as latex foam or sponge rubber. Any suitable material may, however, be used. If the material is cellular, it should be of the type having non-communicating pores or should be provided with a cover or jacket of fabric or some such material as neoprene which, in addition to preventing the cellular material from soaking up water, resists sunlight better than sponge rubber. The rings may also be of hollow material such as rubber or plastics, filled with some liquid material. Gas-inflated or air-inflated rings are preferred.

The rings can be removable from or permanently attached to the barge. Permanently attached rings can be seamed or otherwise integrally formed with the barge. If the rings are removable, the attachment should be of a type such that they cannot be displaced axially astern of the barge. It should also preferably be of a type that will tend to deflect obstacles from the rings so that collisions do not tend to displace them.

The cross-section of the material that the rings are made of will be such as to cause maximum break-up of the flow along the sides of the barge with a minimum of drag. A circular cross-section is suitable for this purpose but a triangular cross-section is preferred.

The stern of the barge will in general be tapered. The position of the ring or rings is desirably such that, when one ring is used, it lies at the point where the barge diameter is about 80% of its maximum diameter (herein called the 80% point), and such that, when two or more rings are used, the center of the ring system lies at the 80% point.

If a single ring is used its radial width is preferably about one-twelfth of the maximum barge diameter. If two or more rings are used their radial widths can be smaller. The axial width is not critical, but one-sixth to one-quarter of the maximum barge diameter has been found suitable for a single ring of triangular cross-section.

The invention will now be described with reference to the examples illustrated in the accompanying diagrammatic drawings, in which:

FIG. 1 is a fragmentary pictorial view of a barge according to the invention. Only the stern portion is shown, the amidships and bow portions not being of interest to the present invention.

FIGS. 2, 3, 4, 7 and 8 are views similar to FIG. 1 but each showing different embodiments of the invention;

FIG. 5 is an enlarged sectional detail of water-deflecting means of a barge according to a still further embodiment of the invention; and FIG. 6 is a pictorial view of an inflatable core for the water-deflecting means of a barge according to the invention.

Referring to FIG. 1, the water-deflecting member for the tapered stern portion 1 of a barge is shown in the form of a continuous ring 2 of substantially circular cross-section projecting from the surface of the barge envelope at the 80% point (as hereinbefore defined). The ring comprises a core 3 of preformed foam rubber, plastics or any other suitable filling material housed or encased in a jacket or sheath 4 terminating in a skirt 6 which is removaly secured as at 7 to patches 8 mounted on the surface of the barge envelope at a position forward of the ring 2. The securing means 7 may be of rope, wire, webbing or the like passing through apertures 9 in the skirt 6.

The ring is prevented from moving aft by the means 7. It is prevented from slipping forward by the tapering stern of the barge itself, but once the barge is under way the water flow prevents forward slipping in any case. During towing, the ring 2 creates breakaway in the flow lines of the water along the surface of the stern 1 to decrease or eliminate the forces which would otherwise cause snaking. The radial width of the ring suitable for achieving this is preferably one-twelfth of the maximum barge diameter.

A second ring 2a, secured in identical manner, may be provided aft of the ring 2 as shown in dotted lines in FIG. 1. However, in this case it is the center of the ring system that lies at the 80% point (as herein before defined).

FIG. 2 illustrates the tapered stern portion 11 of a barge having a water-deflecting member in the form of a continuous ring 12 of substantially triangular cross-section projecting at the 80% point. The ring is made from preformed rubber or plastics and is releasably held against displacement astern by a number of rubberized fabric slings 14 each lashed by means 17 passing through apertures 19 to handling patches 18 mounted on the barge envelope.

The cross-section of the ring may be a substantially right-angled triangle having a short side 15 facing aft, a longer side (hidden in FIG. 2 and not being the hypotenuse) in contact with the barge envelope and a hypotenuse 20 sloping forward. The side 15 has a length of about one-twelfth the maximum barge diameter. The longer side has a length of about one-sixth to one-quarter of the maximum barge diameter. The hypotenuse 20 readily permits obstacles to ride over the ring.

The ring 22 shown on the barge stern 21 in FIG. 3 is the same as the ring 12 in FIG. 2, but the lashings 27 from the patches 28 are shackled or spliced to eye bolts 24 which pass through the ring and are secured by nuts 25 bearing on washers 30 on the stern face of the ring. The bolts are arranged so that they do not touch the barge envelope.

The FIG. 1–3 constructions are intended for barges travelling in inland waters or at moderate speeds. For sea-going barges, rough weather conditions, and high speeds, it has been found that the strain placed on the patches to which the ties or lashings are secured becomes excessive, and one of the embodiments described hereinafter is preferred where each ring comprises a core of the desired cross-section held by a jacket which terminates in a skirt attached directly to the barge envelope. The FIG. 1 and 2 embodiments can, however, be modified by omitting the lashings 7 and 17 respectively, and cementing the skirt 6 and slings 14 respectively, directly to the envelope.

In FIGS. 4 and 5, the stern 31 of the barge has secured to it a ring 32 comprising a distensible rubberized fabric core 33 of triangular section when distended (FIG. 4) or a preformed triangular foam rubber or plastics core 35 (FIG. 5). Alternatively, the core may comprise a number of juxtaposed thick-walled self-supporting tubes or thin-walled distensible tubes. A suitable distensible core 33 is shown in FIG. 6, where internal bulkheads 41 ensure that the core takes up the correct triangular shape when inflated or distended with fluid. The fluid is supplied through an inlet 42 and the compartments formed by the bulkheads intercommunicate through apertures 43.

Apart from different cores, the FIG. 4 and 5 constructions are the same. The core 33 or 35 is removably housed in a rubberized fabric jacket 34 which is made in two parts, namely an inner part 34a and an outer part 34b. The jacket terminates in a skirt 36 which is carried by the part 34a and which is cemented directly to the barge envelope up to the foreward edge of the core. However, under some conditions it may be desirable also to cement down the inner jacket part 34a. If the cementing joint stops at the core as illustrated in FIG. 5, a hinge 44 in the form of a folded piece of relatively thin rubberized fabric is cemented, with the folded edge foreward, to the inner jacket part 34a and to the envelope 31. This tends to prevent the cement joint of the skirt from peeling back during handling of the barge.

The outer jacket part 34b is cement jointed to the skirt at 46. This joint is also protected by a fabric hinge 47. The after ends of the fabric jacket parts are tailored to bend towards each other and are provided with lacing holes 48 which are heavily marginally reinforced at 49 and through which there are threaded a lacing cord or cords 51.

In practice, there are more lacing holes than has been possible to indicate in FIG. 4.

FIG. 4 also shows how the tapering stern portion of the barge is made from strips 52 of fabric joined side to side and covered with sealing straps 53 over the longitudinal seams. If smooth seams such as that in FIG. 8 of copending patent application No. 858,358 are used to construct the stern, they will not form unduly uneven seatings for the inner jacket part 34a and skirt 36 and there will be little danger of peeling at the seams.

For other types of barge seams where there is a less even seating surface for the ring of the invention, the FIG. 7 embodiment may be more suitable. Here, the construction is similar to FIGS. 4 and 5, except that the jacket or sheath is made in the form of a number of separated segments or slings 54 seated on the fabric 52 between the sealing straps 53. Alternatively, the FIG. 8 construction can be used, in which the ring comprises a number of separated ring segments 56 each housed in a jacket 57 which is laced up along three edges and attached to the barge between the seam straps 53. The jackets may be constructed and cemented to the barge in a manner similar to that described with respect to FIG. 5. If measures are taken to prevent the barge from rolling about its longitudinal axis, that is to say if the barge when towed is likely to have a predetermined side uppermost, then those ring segments which contribute least to the stabilising performance (the segments at the top and the bottom of the barge) may be omitted for the purpose of reducing drag.

We claim:
1. A barge for transporting, by towing, a fluent cargo less dense than water, comprising a totally enclosed elongated flexible envelope adapted to float in water when containing such cargo, said envelope comprising a tapered stern portion of substantially streamline shape when laden, and a water deflecting member in the form of a flexible ring projecting from the surface of the envelope at an intermediate position on said stern portion.
2. A barge according to claim 1, wherein the water deflecting ring gradually increases in cross section from front to rear thereof, a bluff surface being presented at its rear.
3. A barge according to claim 1, wherein said ring is attached to the envelope in a manner permitting removal thereof without dismantling the envelope.
4. A barge according to claim 1, wherein said ring projects from the barge at a point whre the barge diameter is about 80% of its maximum diameter.
5. A barge according to claim 4, wherein the water deflecting ring has a radial width equal to about one-twelfth of the maximum barge diameter.
6. A barge according to claim 1, having two or more water deflecting rings forming a ring system, wherein the center of the ring system lies at a point where the barge diameter is about 80% of its maximum diameter.
7. A barge according to claim 1, wherein said ring comprises a core held by a jacket terminating in a skirt which is cemented directly to the barge envelope.
8. A barge according to claim 7, wherein the jacket comprises inner and outer parts, the inner part carrying the skirt and the outer part being laced to the inner part at one end and cemented to the skirt at the other end.
9. A barge according to claim 7, wherein the stern portion of the envelope is made from strips of fabric joined side to side and covered with sealing straps over the seams, the jacket comprising a number of separated segments seated on the envelope fabric between the sealing straps.
10. A barge according to claim 8, wherein the inner jacket part at the place where it meets the skirt and the outer jacket part at the place where it rises from the skirt, are hinged to the barge envelope and to the skirt respectively, by a folded piece of fabric.
11. A barge according to claim 7, wherein the core is of triangular cross-section and is made from a preformed multi-cellular material.
12. A barge according to claim 7, wherein the core is distensible.
13. A barge according to claim 7 wherein the core comprises internal bulkheads.
14. A barge for transporting, by towing, a fluent cargo less dense than water, comprising a totally enclosed elongated flexible envelope adapted to float in water when containing such cargo, said envelope comprising a tapered stern portion of substantially streamline shape when laden, said stern portion of the envelope being made from strips of fabric joined side to side and covered with sealing straps over the seams, and a water deflecting device in the form of a flexible segmented ring projecting from the surface of the envelope at an intermediate position on said stern portion, the said ring segments being separate from one another and each said ring segment comprising a core contained in a jacket terminating in a skirt which is cemented directly to the barge envelope to lie between the said sealing straps.

References Cited in the file of this patent
UNITED STATES PATENTS

Re. 18,534    Johnson    July 19, 1932
1,154,955    Wills    Sept. 28, 1915
(Other references on following page)

UNITED STATES PATENTS

| | | |
|---|---|---|
| 1,682,262 | Antoni | Aug. 28, 1928 |
| 2,243,906 | Huet | June 3, 1941 |
| 2,391,926 | Scott | Jan. 1, 1946 |
| 2,793,828 | Rohtert | May 28, 1957 |
| 2,915,948 | Fehring | Dec. 8, 1959 |

FOREIGN PATENTS

| | | |
|---|---|---|
| 1,156,236 | France | Dec. 9, 1957 |
| 1,159,028 | France | Feb. 3, 1958 |
| 1,183,751 | France | Feb. 2, 1959 |
| 821,143 | Great Britain | Sept. 30, 1959 |